United States Patent [19]

Dartnall

[11] Patent Number: 5,119,858

[45] Date of Patent: Jun. 9, 1992

[54] VALVE

[75] Inventor: William J. Dartnall, Applecross, Australia

[73] Assignee: Dartnall Engineering & Innovation PTY Ltd., Australia

[21] Appl. No.: 734,174

[22] Filed: Jul. 22, 1991

Related U.S. Application Data

[62] Division of Ser. No. 473,938, Feb. 26, 1990, abandoned.

[30] Foreign Application Priority Data

Aug. 26, 1987 [AU] Australia .................. PI4014

[51] Int. Cl.⁵ .................. F16K 1/42; F16K 15/06
[52] U.S. Cl. .................. 137/516.25; 251/172; 251/175; 251/359
[58] Field of Search .............. 251/172, 210, 359, 175, 251/516.25, 516.27, 516.29

[56] References Cited

U.S. PATENT DOCUMENTS

| | | | |
|---|---|---|---|
| 1,983,797 | 12/1934 | Greve | 251/172 |
| 3,618,893 | 11/1971 | Bois | 251/172 X |
| 4,064,904 | 12/1977 | Tolnai | 251/172 |
| 4,530,373 | 7/1985 | Bork | 251/172 X |

Primary Examiner—Robert G. Nilson
Attorney, Agent, or Firm—Harness, Dickey & Pierce

[57] ABSTRACT

A valve comprises a valve member engageable with a valve seat provided in a valve body, an annular seal slidably supported on the valve member or adjacent the valve seat and having an axial end face which is sealing engageable with the valve seat or valve member respectively on engagement of the valve member with the valve seat, the axial end face providing at least some of the sealing between the valve member and valve seat. In use the differential in pressure existing between the upstream side of the valve member, and thus closed space, and the downstream side of the valve member when the valve is closed produces an axial force on the seal to drive it axially into sealing engagement with the valve seat or valve member respectively. Any wear of the axial end face of the seal is accommodated by such axial movement.

12 Claims, 13 Drawing Sheets

VALVE

This application is a continuation application of U.S. Application Ser. No. 07/473938, now abandoned.

THIS INVENTION relates to a fluid valve.

A difficulty relating to fluid valves resides in the wear experienced by the seals of such valves which necessitate replacement or servicing of the seals at regular intervals. The need for such replacement or servicing arises particularly where the valve is used with abrasive and/or corrosive materials or fluids.

It is an object of this invention to provide a valve incorporating a seal which can accommodate for some wearing of the seal.

In one form the invention resides in a valve comprising a valve member engagable with a valve seat provided in a valve body to close said valve, an annular seal slidably supported adjacent the valve seat to be movable towards and away from valve member and having an axial end face which is sealing engagable with the valve member on engagement of the valve member with the valve seat, said axial end face providing at least some of the sealing between the valve member and valve seat, said seal defining a closed space between the Valve body and said annular seal, said closed space being in communication with low pressure side of the valve when the valve is closed, the exterior of the seal being subjected to the pressure at the high pressure side of the valve when the valve is closed whereby the seal is subjected to a force in the direction of the valve member when said valve is closed as a result of the differential in pressures present to either side of the valve member.

The invention will be more fully understood in the light of the following description of one specific embodiment. The description is made with reference to the accompanying drawings of which:

Figure 1:
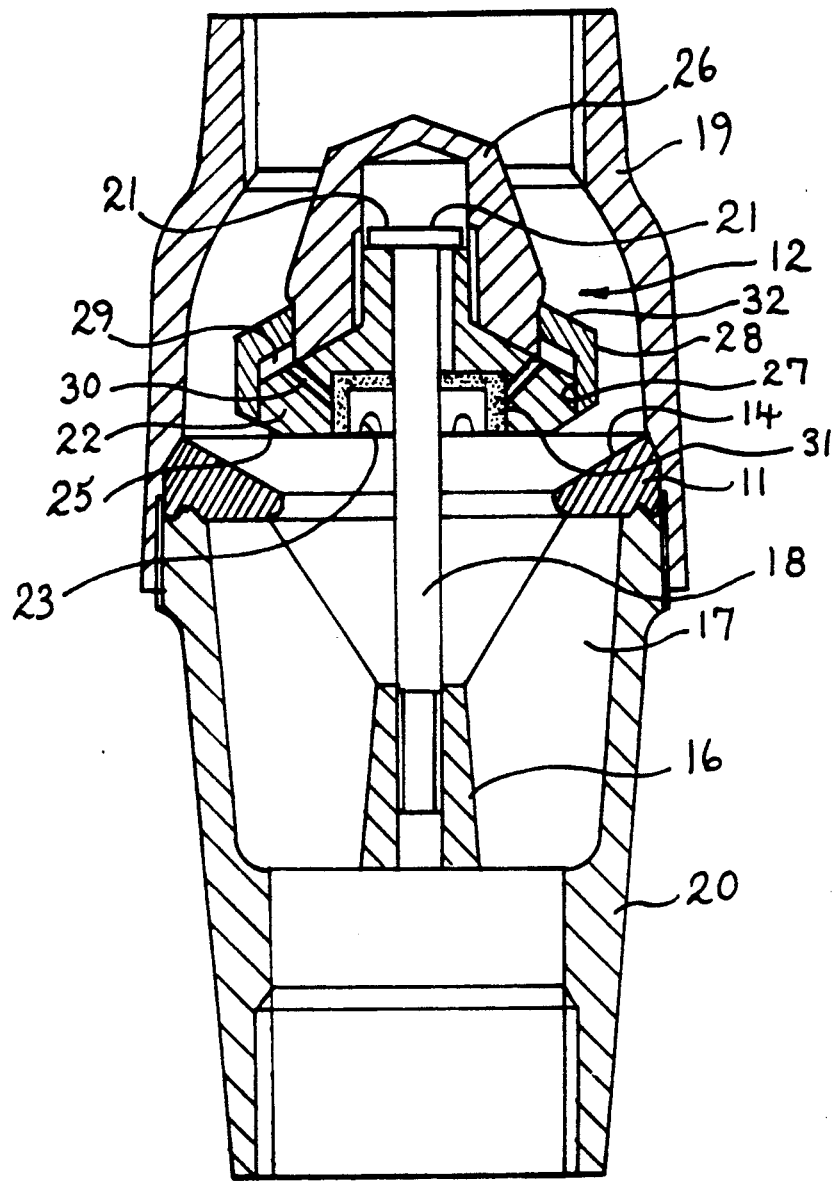
FIG. 1 is a sectional elevation of a valve according to the first embodiment in the open position.

The first embodiment is directed to a non return valve which comprises a valve seat 11 which is held in clamping engagement between a pair of pipe couplings 19 and 20. A valve member 12 is supported from one of the pipe couplings 20 to be movable into and out of sealing engagement with the valve seat 11. The valve seat il has an annular configuration and is formed with a tapered axial sealing face 14. The one pipe coupling 20 clampingly engages the valve seat in opposed relation to the sealing face 14. In addition the one pipe coupling 20 is formed with a central boss 16 which is supported from the internal wall of the one pipe coupling 20 by radial webs 17. The central boss supports a central axially directed spigot 18 which extends from the central boss 16 through the valve seat 11 and is formed at its outer end with an enlarged end 21.

The valve member 12 comprises a first portion 22 having a central bore which is slidably received over the spigot 18 where the first portion 22 is axially slidable on the spigot 18 between a position at which the sealing face 25 of the first portion 22 is in sealing engagement with the sealing face 14 of the valve seat 11 and a position whereby said sealing faces are out of engagement and the first portion is in abutment with the enlarged end 21 of the spigot. The first portion 22 of the valve member 12 is formed with a side wall 27 which is adjacent the sealing face 22 Which is of a substantially cylindrical configuration and which extends for only a portion of the length of the first portion 22. The remainder of the first portion 22 is of a reduced cross section and supports a cap member 26 which encloses the outer axial end of the first portion 22 and defines a space which encloses the enlarged end 21 of the spigot 18 and allows the relative reciprocation between the valve member 12 and the spigot 18 between the two end positions thereof. The inner axial end of the first portion 22 accommodates an annular seal 23 which slidingly and sealingly engages with the spigot 18 and which is surrounded by a porous packing gland 31. The valve member 12 further comprises a seal member 28 which is of a substantially annular configuration and which is slidably and sealingly received over the cylindrical side wall of the first portion 22 whereby its innermost axial face forms an extension of the sealing face 25 of the first portion 22 and sealingly engages the sealing face 14 of the valve seat 11 when the valve member 12 is in sealing engagement with the valve seat 11. The outer axial end of the seal is formed with an inwardly directed flange 32 which slidably and sealingly engages the outer face of the cap member 12 and which defines a closed space 29 between the interior of the seal 28 and the first portion 22. A series of passageways 30 extend through the first portion 22 between the closed space 29 and the porous packing gland 31 to provide for fluid communication between the closed space 29 and the upstream face of the valve member 12.

Figure 2:
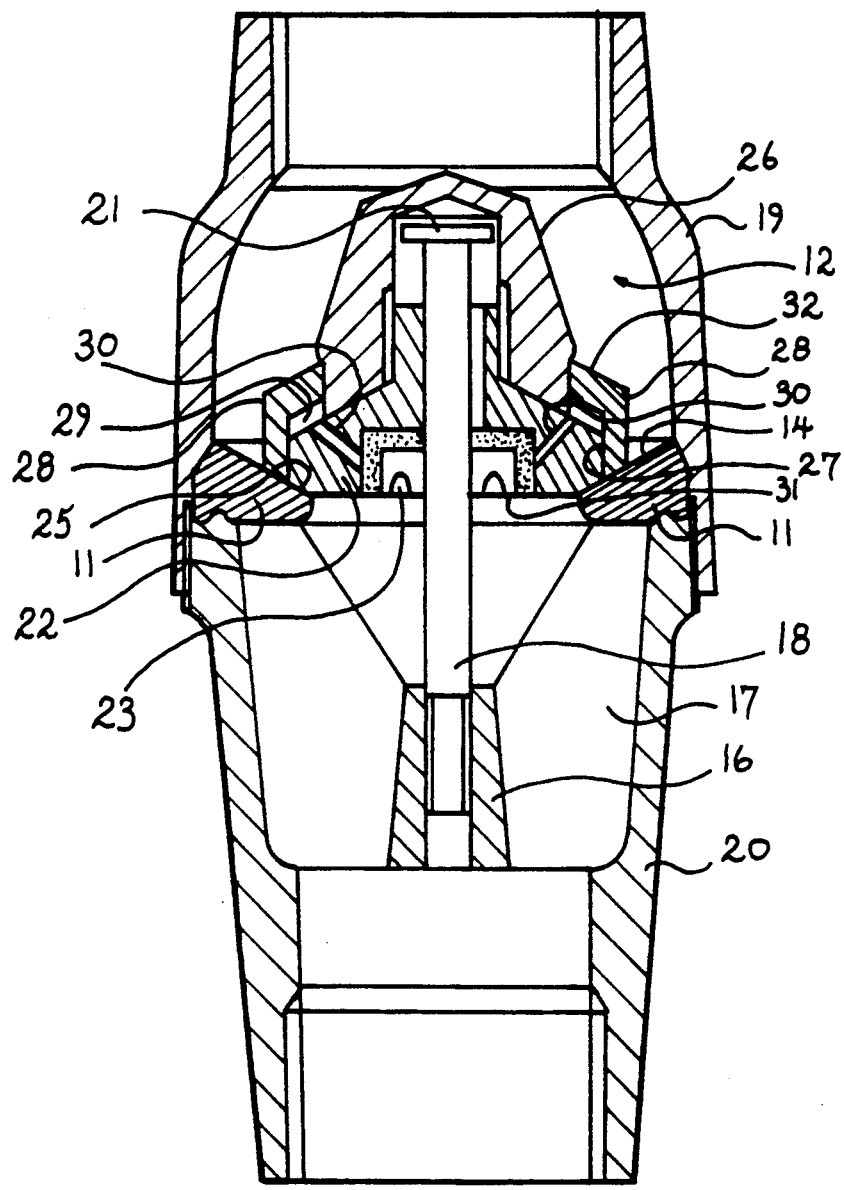
FIG. 2 is a sectional elevation of a valve according to the first embodiment in the closed position.

In use the valve member is caused to reciprocate between the open and closed position as shown at FIGS. 1 and 2 respectively as a result of varying differential fluid pressures existing to each side of the valve member 22. On the closing of the valve by the engagement of the valve member 12 with the valve seat 11. The sealing faces 25 and 14 respectively are engaged with each other. In addition the innermost axial face of the seal 28 becomes engaged with the sealing face 14 of the valve seat. Such engagement is facilitated and enhanced as a result of the differential fluid pressures that exist between the exterior face of the seal 28 which is subjected to the downstream fluid pressures within the valve and the closed space 29 which is subjected to the upstream pressure. As a result of such differential pressures the seal 28 is caused to be moved in the direction of the valve seat to effect a sealing engagement therebetween. In the event of the innermost axial face of the seal being subjected to wear it will be caused to move axially over the cylindrical side walls of the first portion 21 and the direction of the valve seat to accommodate for such wear until such time as the inner face of the annular flange bears against the first portion.

Figure 3:
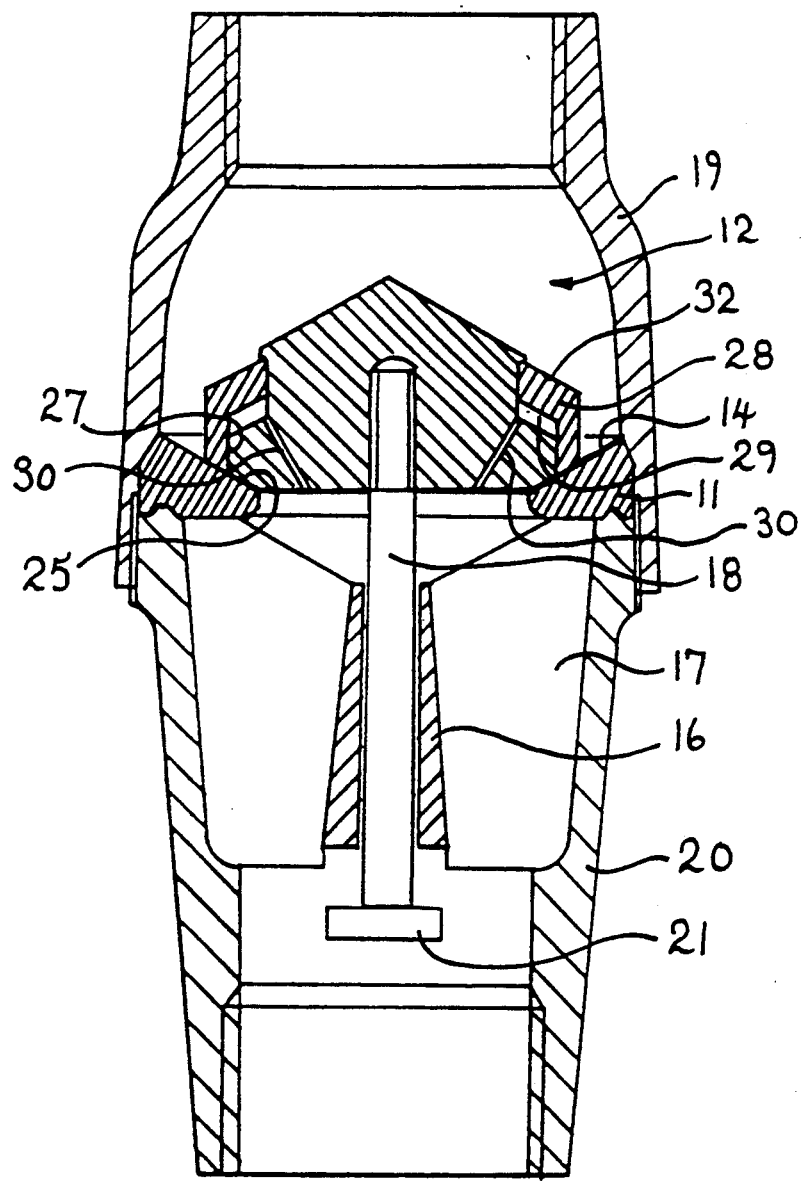
FIG. 3 is a sectional elevation of a second embodiment in the closed position.
Figure 4:
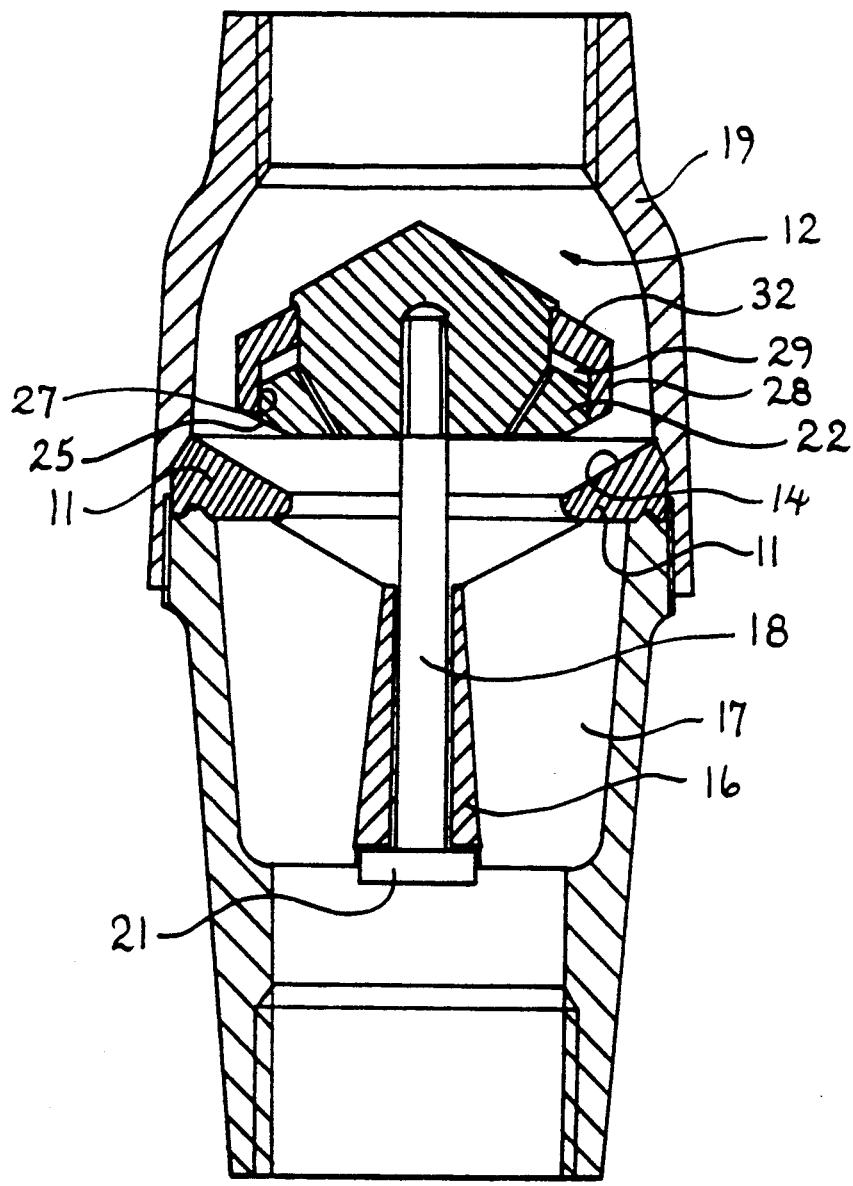
FIG. 4 is a sectional elevation of the second embodiment in the open position.

The second embodiment as shown at FIGS. 3 and 4 is of a similar form to the first embodiment except that the valve member 12 is fixed to the central axially spigot 18 which is slidably supported from the central boss 16 of the one type coupling 20. As a result no provision needs to be made for the provision of a seal between the first portion 22 of the valve member 12 and the spigot 18 and a cap element 26 does not need to be provided at the outer axial end of the first portion 22. Therefore the inner circumference of the flange of the seal 28 is slidably and sealingly engaged with the reduced diameter portion of the first portion 22. In addition the passageways 30 which communicate with the closed space 29 open to the innermost axial face of the first portion 22 at a location spaced radially inwardly from the inner circumference of the valve seat 11. If desired a suitable filter or sieve may be provided for the ports 30 to prevent a blockage thereof by any particulate materials.

Figure 5:
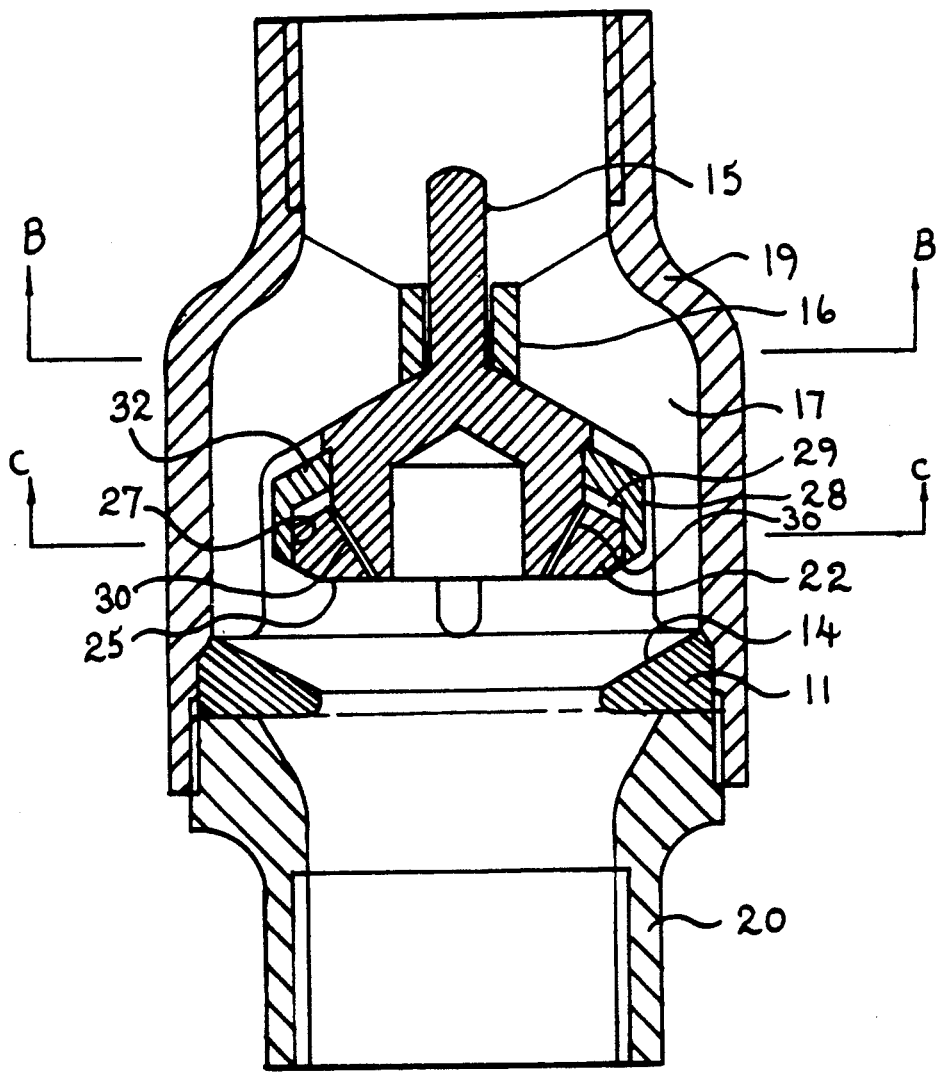
FIG. 5 is a sectional elevation of the third embodiment in the open position.
Figure 6:
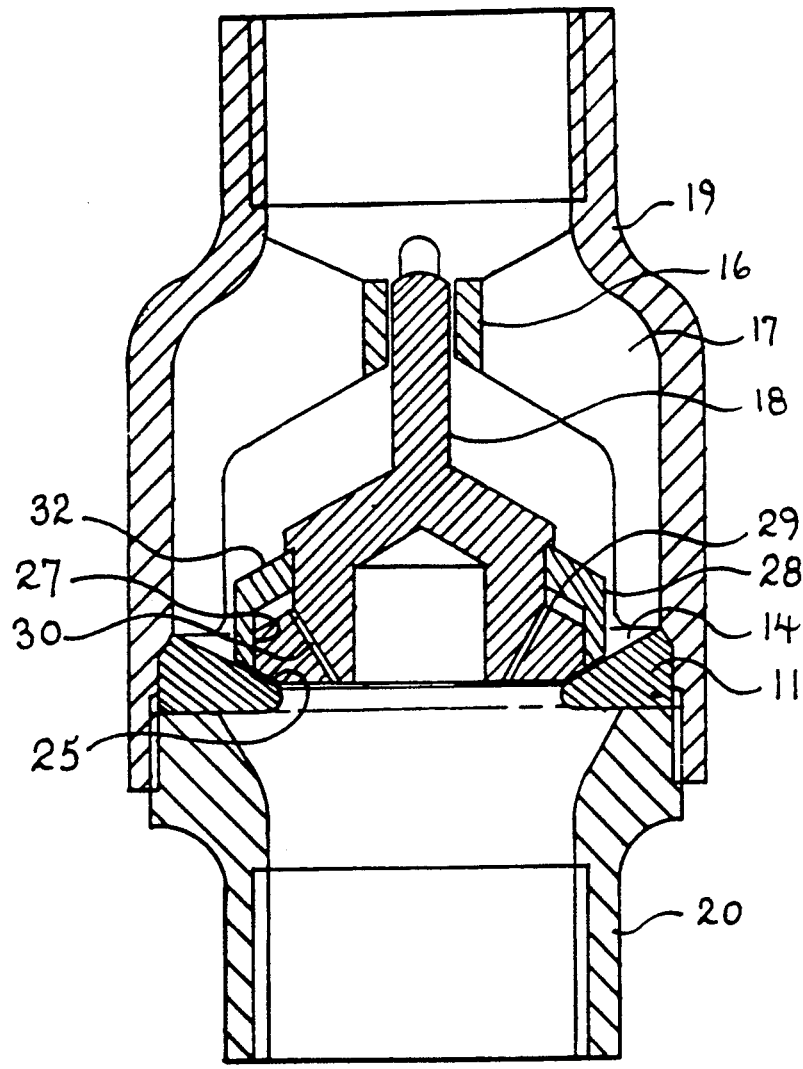
FIG. 6 is a sectional elevation of the third embodiment in the closed position.
Figure 7:
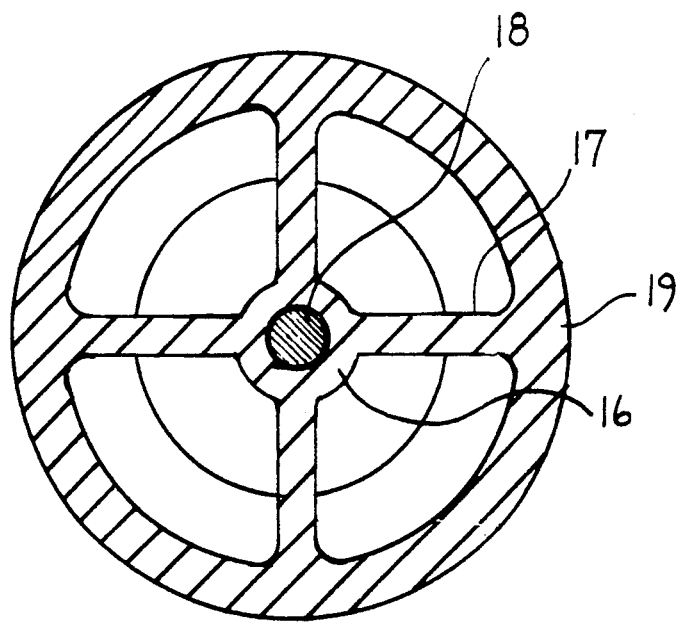
FIG. 7 is a cross section of the third embodiment along line B—B of FIG. 5.
Figure 8:
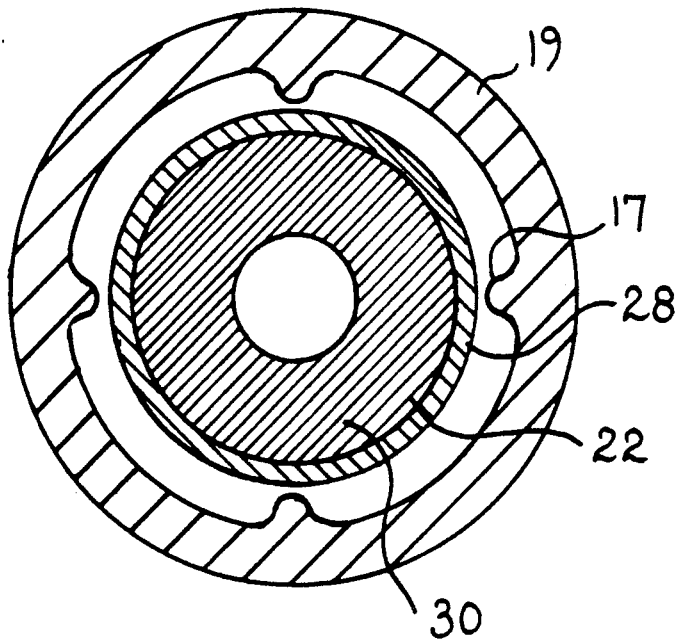
FIG. 8 is a cross section of the third embodiment along line C—C of FIG. 5.

The third embodiment as shown at FIG. 5 is of a similar general configuration to the second embodiment except that the support for the valve member is provided from the other pipe coupling which is located to the side of the valve seat 11 at which the valve member 12 is accommodated and whereby the central spigot 18 extends from the outermost axial end of the first portion 22 of the valve member 12 to be accommodated by the central boss 16 which is supported from the internal face of the other pipe coupling 19 by radial webs 17.

Figure 9:
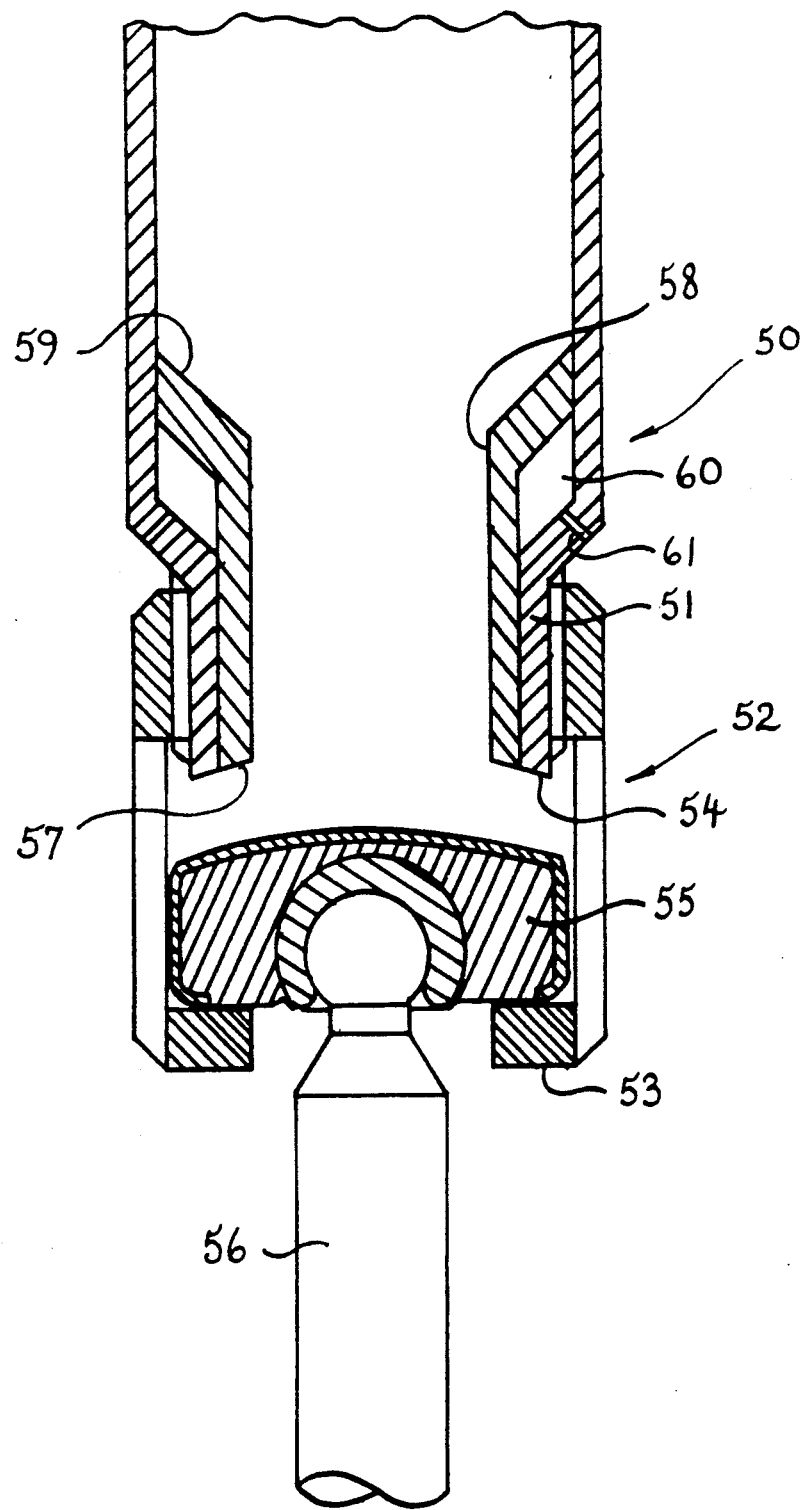
FIG. 9 is a sectional elevation of the fourth embodiment in the open position.
Figure 10:
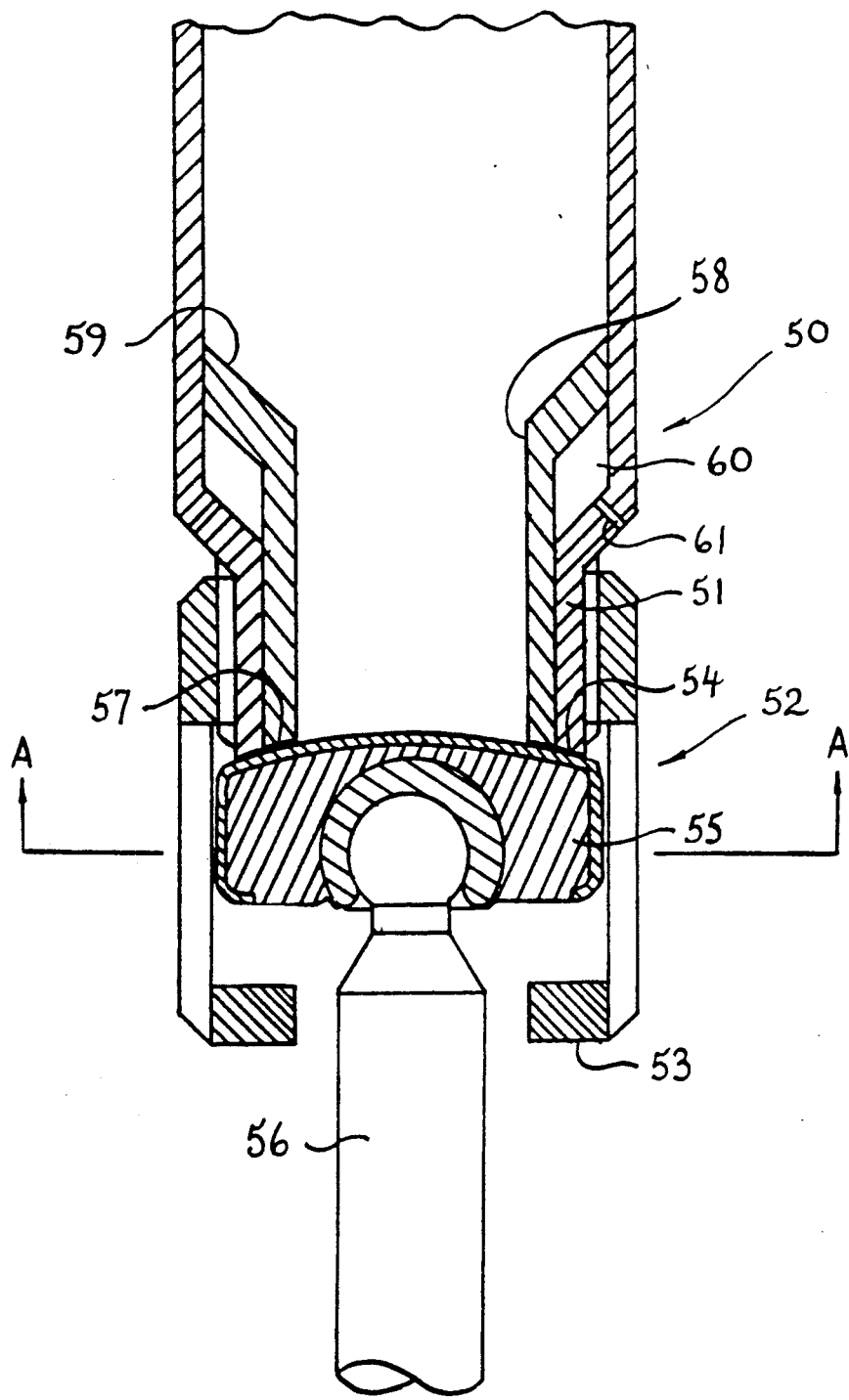
FIG. 10 is a sectional elevation of the fourth embodiment in the closed position.
Figure 11:
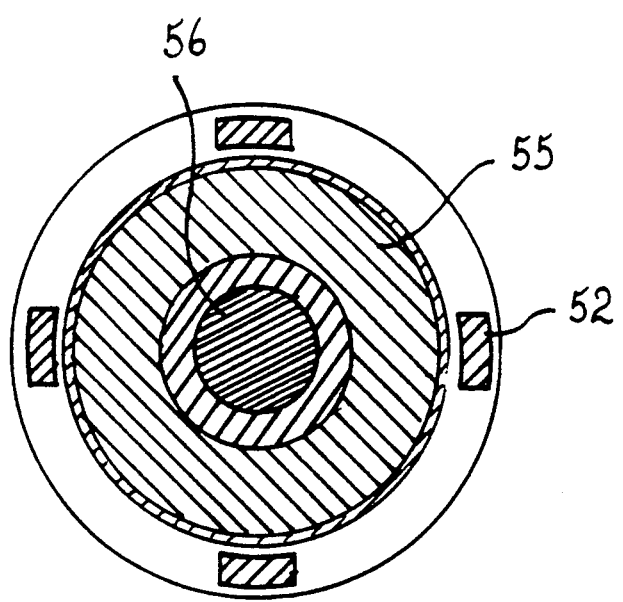
FIG. 11 is a cross section of the fourth embodiment along line A—A of FIG. 10.

The fourth embodiment as shown at FIGS. 9, 10 and 11 is directed to a non return valve which is provided at the end of a tubular body 50 which is formed at its end by a reduced diameter portion 51. The reduced diameter portion 51 supports at its outer end a cylindrical cage like support 52 having an annular end wall 53 which is spaced axially from the outer end of the reduced diameter portion 51. The outer axial end of the reduced diameter portion 5 provides the valve seat of the valve which is engagable by a valve member 55 which is axially movable within the cage like support 52 between the end of the reduced diameter portion 51 and the end wall 53. The valve member is supported by a suitable control rod or like means 56 which effects the movement of the valve member between the respective positions. The tubular body 50 supports a seal 58 which is slidably and sealingly engagable with the internal cylindrical face of the reduced diameter portion 51 whereby its outermost axial end face 57 will form an extension of the valve seat 54 and bear on the valve member 55 when the valve member 55 is in sealing engagement with the valve seat 54. The inner axial end of the seal 58 is formed with an outwardly directed flange 58 the outer periphery of which is in sliding engagement with the internal face of the tubular body 50 and which defines a closed space 60 between the seal 58 and the interior face of the body 50. Communication ports are provided through the walls of the body 50 to provide communication between the closed space 60 and the exterior of the body 50. In use when the valve member 55 is brought into sealing engagement with the end of the tubular body 50 a positive differential pressure exists between the interior of the tubular body 50 and the exterior thereof which produces a positive differential pressure between the interior of the tubular body 50 and the closed space 60. As a result of such differential in pressures the seal 58 is driven axially in the direction of the valve member 55 to be brought into sealing engagement therewith. Any wear of the axial outer end face of the seal 58 will be accommodated for as a result of such axial movement of the seal 58.

Figure 12:
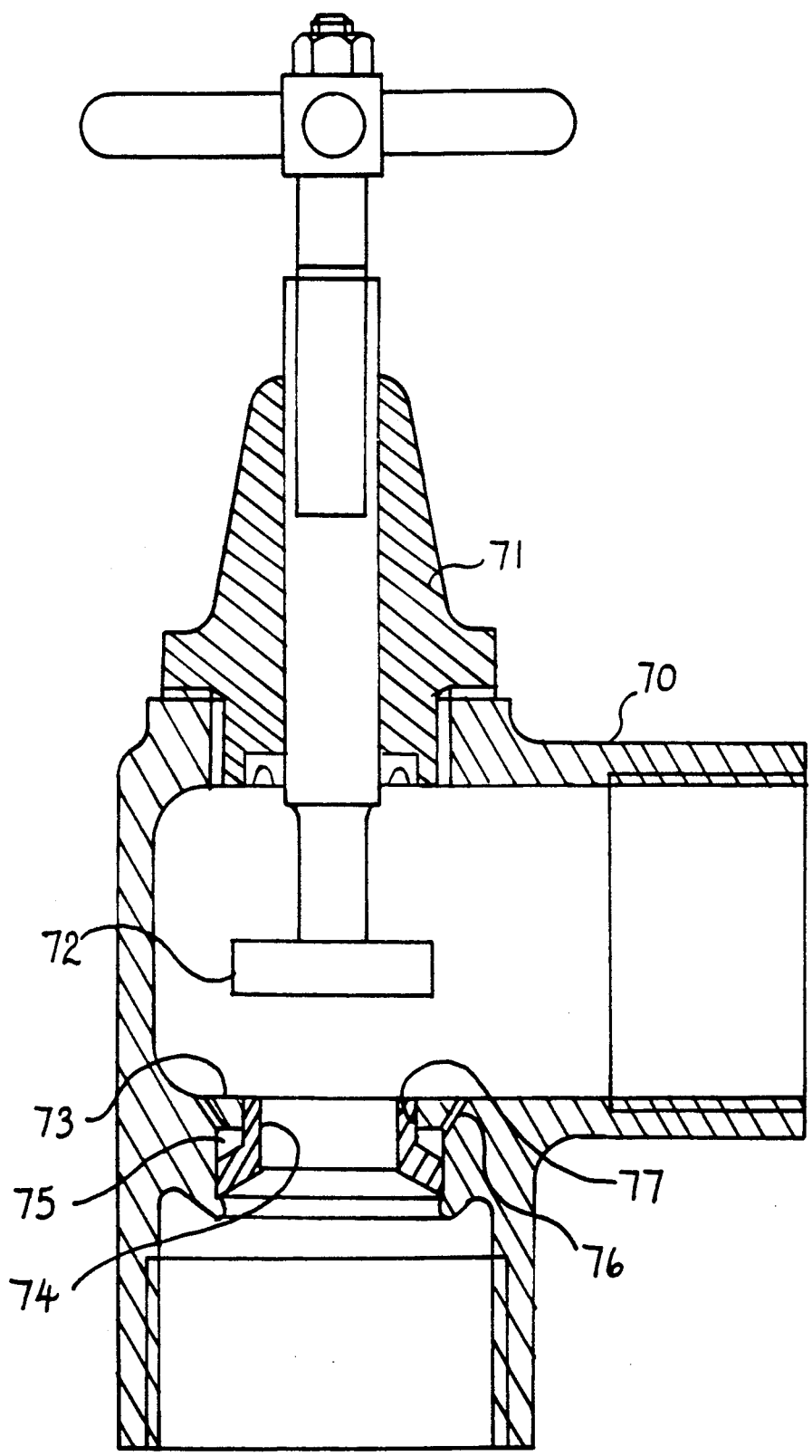
FIG. 12 is a sectional elevation of the fifth embodiment in the open position.

The fifth embodiment as shown at FIG. 12 is directed to a faucet valve which is accommodated within a valve body 70 having a substantially conventional top assembly 7 which causes movement of a valve member 72 into sealing engagement with a fixed valve seal 73. The top assembly 71 is of substantially conventional form. The valve seat 73 is associated with a seal 74 which is of a substantially annular configuration and is slidably received over the inner periphery of the seat 73. The upstream face of the seal 74 is formed with an outwardly directed flange which slidably engages the sides of the valve body adjacent the valve seat 73 to define a closed space 75 therebetween. Communication ports 76 extend between the closed space 75 and the downstream side of the valve body 70 to the sides of the valve member 72 when engaged with the valve seat 73. When the valve member 72 is in engagement with the valve seat 73 to close the valve the positive differential pressure which exists between the upstream side of the valve body 70 and the downstream side of the valve body 70 and thus the closed space 75 produces a positive course on the seal 74 to drive it into sealing engagement with the valve member 72. Any wear of the sealing face 77 of the seal is accommodated by such positive force.

In each of the embodiments described above the flange 32 may be fixed to the valve member or the valve body rather than be in sliding engagement. As a result the flange 32 is formed to be capable of flexing as the seal moves axially.

Figure 13:
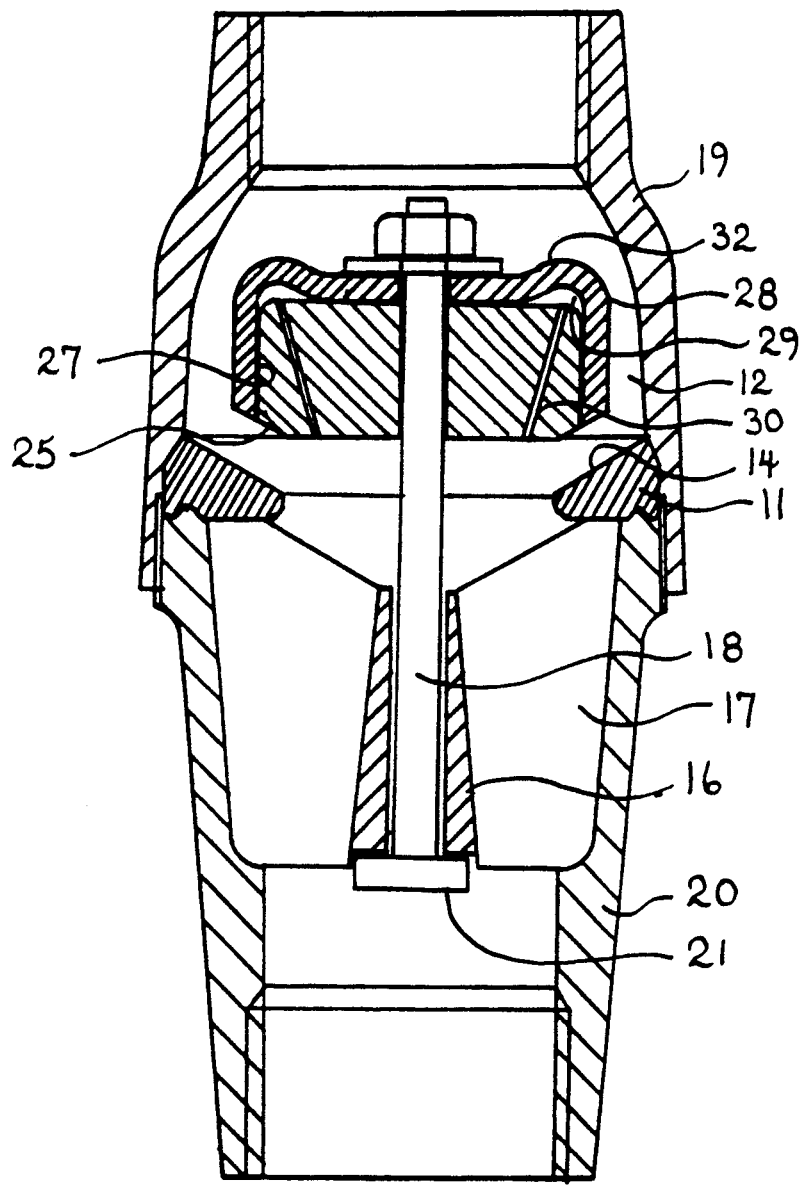
FIG. 13 is a sectional elevation of a sixth embodiment in the open position.
Figure 14:
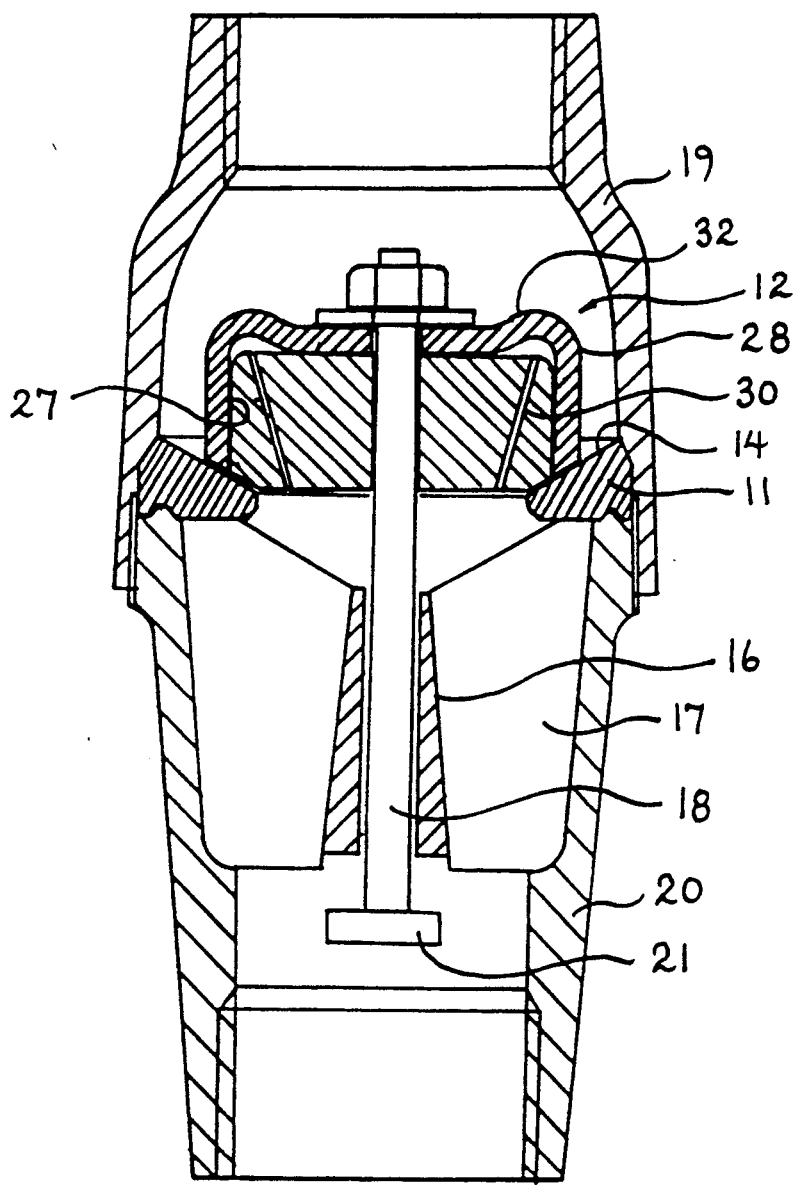
FIG. 14 is a sectional elevation of the sixth embodiment in the closed position.

The sixth embodiment shown at FIGS. 13 and 14 is a variation of the second embodiment of FIGS. 3 and 4. The variation comprises forming the flange 32 of the seal such that it is flexible and substantially encloses the one end of the seal. When applied to the valve member the flange 32 is fixed to the outer axial face of the valve member as shown to define the closed space 29 between the outer end face of the valve member.

In each of the embodiments if desired the seal can be formed of a Wearable material such as an elastomeric or like material such as rubber, polyurethane or like material. Such a material enables the axial end face of the seal to conform to any irregularities in or on the sealing face of the valve seat to seal that surface.

If desired the valve seal may be formed of a very wear resistant material while the valve member is formed of a less wear resistant material whereby in use the valve member only with be subjected to wear.

It should be appreciated that the scope of the present invention need not be limited to the particular scope of the embodiment described above.

I claim:

1. A valve comprising a valve member element engagable with a valve seat element provided in a valve body to close said valve, an annular seal slidably supported on one of said valve elements and having an axial end face which is sealing engagable with the other valve element on engagement of the valve member element with the valve seat element, said axial end face providing at least some of the sealing between the valve member element and valve seat element, said seal defining a closed spaced between the one valve element and said annular seal, said closed spaced being in communication with the lower pressure side of the valve when the valve is closed, the exterior of the seal being subjected to the pressure at the high pressure side of the valve when the valve is closed whereby the seal subjected to a force in the direction of the other valve element when said valve is closed as a result of the differential in pressure present to either side of the valve member element.

2. A valve as claimed in claim 1 wherein the seal is formed with a radially directed flange towards its other end and said flange is sealingly supported from the one valve element to define the closed space.

3. A valve as claimed in claim 2 wherein said flange is axially slidably supported from the one valve element.

4. A valve as claimed in claim 2 wherein the communication is provided by at least one passageway through the one valve element to open at its open end into said closed space at a position spaced from the sealing engagement of the valve seat element and valve member element, said passageway being associated with a filter means at its open end.

5. A valve as claimed in claim 3 wherein the seal is supported from the valve member element.

6. A valve as claimed in claim 5 wherein the seal is received over a portion of the valve member element having cylindrical configuration.

7. A valve as claimed in claim 6 wherein the flange of the seal is slidably and sealingly engaged with a reduced diameter portion of the valve member element.

8. A valve as claimed in claim 3 wherein the seal is slidably supported from the valve body adjacent the valve seat.

9. A valve as claimed in claim 8 wherein the flange is directed radially outwardly and is slidably and sealingly engagable with the valve body.

10. A valve as claimed in claim 5 wherein the flange is fixed to the valve member element.

11. A valve as claimed in claim 10 wherein the flange substantially closes the other end face of the seal and is adapted to flex on axial movement of the seal relative to the valve member element.

12. A valve as claimed in claim 1 wherein the seal is formed of an elastomeric material.

* * * * *